UNITED STATES PATENT OFFICE.

JAMES W. EASTON, OF NEW YORK, N. Y., ASSIGNOR TO P. MINTURN SMITH, OF PLAINFIELD, NEW JERSEY, AND WILLIAM D. PERRY, OF BROOKLYN, NEW YORK.

INSULATING MATERIAL.

SPECIFICATION forming part of Letters Patent No. 436,733, dated September 16, 1890.

Application filed November 16, 1889. Serial No. 330,594. (No specimens.)

*To all whom it may concern:*

Be it known that I, JAMES W. EASTON, a subject of the Queen of Great Britain, residing in the city, county, and State of New York, have invented a new and useful Insulating Material for Electrical Machines, Apparatus, and Appliances, of which the following is a specification.

The object of my improved composition is to provide a low-priced insulating substance possessing the qualities of non-conductivity, strength, hardness, impermeability to moisture, and refractoriness.

My composition consists, primarily, of comminuted or powdered soapstone or other steatite, combined and incorporated with a fibrous material, and where it is desired to render the composition water-proof or non-absorbent any suitable moisture resisting or repelling substance may be incorporated with the other ingredients during the process of manufacture or afterward externally applied to the insulating material itself.

My improved composition is preferably prepared in the following manner: The powdered or comminuted soapstone or steatitic material is mechanically incorporated with sufficient fibrous material—such as jute—to produce a compound having sufficient tensile strength to undergo a process of manufacture similar to that of paper-making. The percentage of soapstone by weight is usually from sixty to seventy-five per cent., and should be as great as is consistent with the production of a material having the requisite degree of tensile strength. The composition is then subjected to a process substantially similar to the old and well-understood process of paper-making, so as to produce a pulp, which contains a large percentage of soapstone. The pulp by a continuation of the process is then formed into boards or sheets, or is pressed or cut into tubes, rings, washers, plates, or any form desired. The soapstone itself being non-absorbent, for ordinary purposes no other treatment is necessary; but where absolute impermeability to water or moisture is desired a moisture resisting or repelling substance—such as paraffine—may be employed for this purpose, and it may be added to the other ingredients during the process of manufacture, or the insulating material may afterward be coated with the waterproofing substance by immersion or otherwise. If added during the process of manufacture, the proportion of waterproofing material should not be large enough to materially increase the inflammability of the insulating material.

My novel composition forms a good non-conductor, and on account of the large percentage of soapstone is sufficiently refractory to perfectly resist an ordinary flame or an electric spark, and even should the insulation be accidentally broken through, as by a very powerful electric spark, the proportion of fibrous material is so small that a continuous carbon track will not be formed.

By reason of its efficiency, durability, and extreme cheapness my new composition possesses very important advantages, and one particular application thereof wherein its desirability is especially prominent is its use for insulating the commutator-sections of a dynamo from each other. In this position it not only resists the action of the electric spark, but as the sections are worn away by the brushes the soapstone in the insulating material between the sections is rubbed by the brushes upon the surface of the commutator, forming a very efficient lubricant.

Having thus described my invention, what I claim as new, and desire to secure by Letters Patent, is—

The insulating material herein described, and consisting of soapstone, waterproofing material, and a fibrous substance, substantially as described.

JAMES W. EASTON.

Witnesses:
S. G. METCALF,
WILLIAM LIND.